Patented Feb. 9, 1937

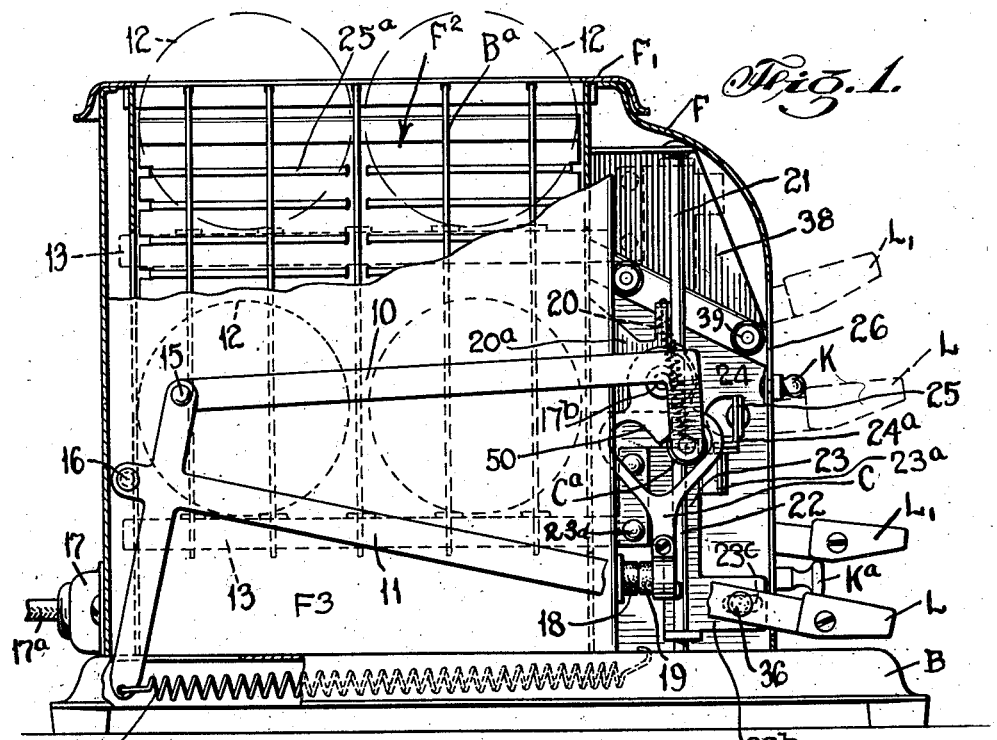
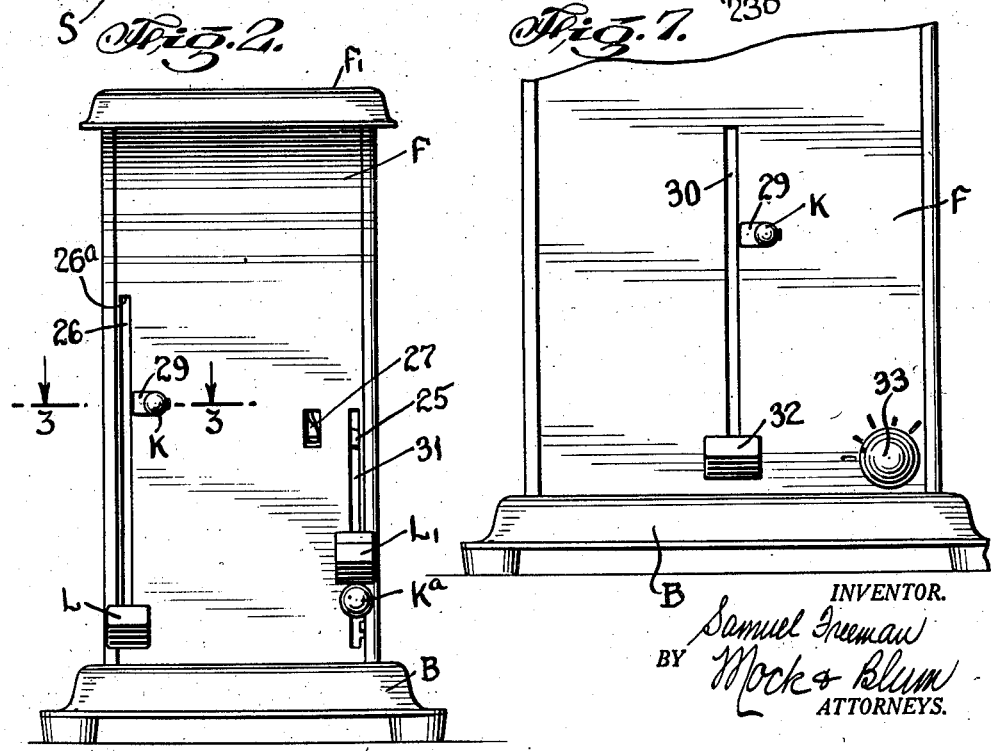

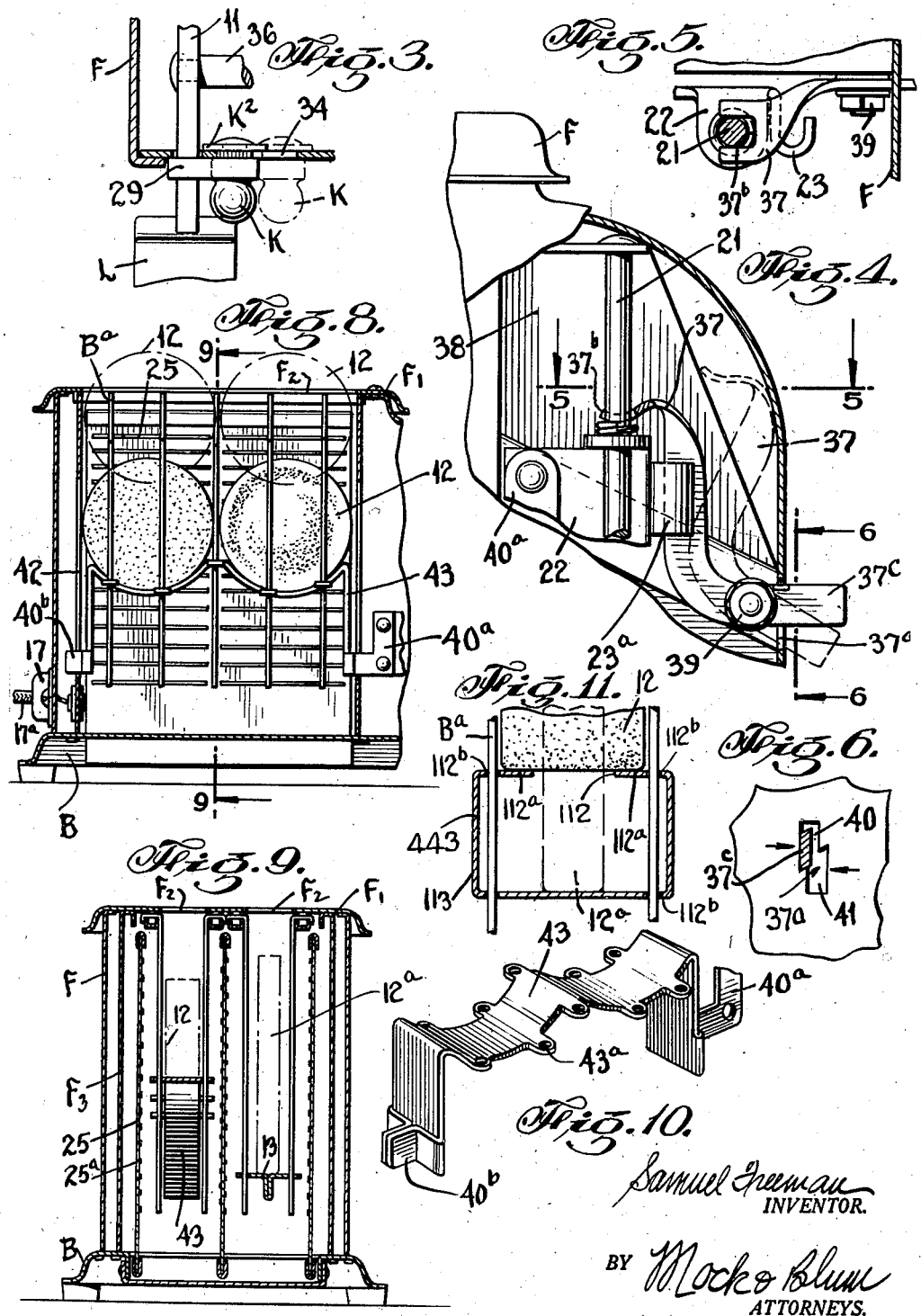

2,070,333

UNITED STATES PATENT OFFICE 2,070,333

TOASTER

Samuel Freeman, New York, N. Y.

Application April 7, 1931, Serial No. 528,263

2 Claims. (Cl. 53—5)

My invention relates to a new and improved toaster.

One of the objects of my invention is to provide a new and improved toaster of the type in which the support for the bread or the like is movably mounted in a casing, and said support is moved upwardly, so that the top of the bread or the like projects above the casing, in order to enable the toasted article to be conveniently removed.

Another object of my invention is to provide a device of this type, in which the upward or expelling movement of said support can be regulated, so that articles of various sizes, such as pieces of bread of various sizes, muffins and the like, can be toasted.

Another object of my invention is to provide a device of this type, which shall include simple and convenient means for adjusting the upward movement of said support.

Another object of my invention is to provide a device of this type which shall be simple and compact, and which can be readily incorporated in automatic devices of the well known type.

Other objects of my invention will be set forth in the following description and drawings, it being understood that the above general statement of the objects of my invention is intended to generally explain the same and not to limit it in any manner.

Fig. 1 is a side elevation of the toaster, partly broken away.

Fig. 2 is a front elevation of the toaster.

Fig. 3 is a section along the lines 3—3 of Fig. 2.

Fig. 4 is a fragmentary view partially in section, showing the arm that limits the intermediate position of the support.

Fig. 5 is a section along the line 5—5 of Fig. 4.

Fig. 6 is a fragmentary view showing the openings, for the arm which controls the intermediate position of the support.

Fig. 7 is a front elevation partially broken away, of another form of toaster.

Fig. 8 is a vertical section partially in elevation, showing how the device is used for toasting muffins or other relatively small articles.

Fig. 9 is a section along the line 9—9 of Fig. 8, showing a device for toasting muffins and slices of bread of ordinary size.

Fig. 10 is a perspective view showing a single type of support for the articles to be toasted.

Fig. 11 is a section of a modified form of a support, showing two platforms.

I have illustrated my invention in connection with several well known automatic types of toaster. The first type illustrated includes a base B and a housing F, having a cover F', provided with longitudinal slots $F^2$.

This type of toaster also includes a lever 11 having an outer head L. This lever 11 is pivoted at 16 to a wall of an inner casing $F^3$. A tension spring S tends to maintain the lever 11 in the upper position, which is indicated by dotted lines in Fig. 1. Near its outer end, the lever 11 is connected by a transverse pin 36 with an extension $23^b$ of a vertically slidable bar 23, which is connected to a vertically movable support 13 by means of rivets $23^d$. The pin 36 moves in a slot $23^c$ of extension $23^b$.

As shown in Fig. 1, the lever 11 is pivotally connected at 15 to a link 10, having a roller $C^a$ which moves in a slot 50 of a switch C. Hence, when the lever 11 is moved down to the full line position shown in Fig. 1, switch C closes the circuit of the electric heating elements $25^a$ in the following manner. On the rear of the toaster is a metal guard 17 which houses an extension cord $17^a$. This extension cord is the means for supplying the current to the switch C. The switch C is pivotally mounted at $17^b$ and has mounted on its lower extremity a carbon electrode 19 which works in conjunction with an electrode 18 and by this means current is allowed to flow from the extension cord $17^a$ to the switch and thru the carbon electrodes 18 and 19 and to the electrical toasting unit $25^a$ in the well known manner. However, the lever 11 would be immediately moved to its upper position, by the spring S, so that said lever 11 is held downwardly, for a predetermined period of time, by the control mechanism provided for this purpose.

The bar 23 is provided with a longitudinally projecting ear $23^a$, which can be engaged by a latch $24^a$, which is pivotally connected to a bar 25 of the timing device. The latch $24^a$ can be laterally turned, so as to release the ear $23^a$, thus permitting the spring S to move the lever 11 to the upper position. The bar 25 and its latch $24^a$ can be moved to the inoperative position, whenever desired, by upwardly moving the trip member 27. The lever L' of the timing mechanism can be moved downwardly, the distance of such downward movement being controlled by a regulating knob $K^a$, which is of the usual type. The timing mechanism to which the lever L' is connected, causes the same to move upwardly with regulated speed after it has been moved downwardly, until it contacts with the member 25, thus moving said member 25 and latch $24^a$ to the inoperative position, thus releasing the lever 11 and permitting a support 13 to move upwardly. These parts per se are all well known, and no further illustration is required.

The lever 11 moves in a slot 26, and the lever L' moves in a slot 31. The slot 26 has a top wall 26ª.

According to my invention, I provide a supplemental stop 29, which is actuated by a knob K which projects from the end wall of the casing F. This stop 29 can prevent the upward movement of the lever 11, so as to limit the upward movement of the support 13. The adjacent wall of the casing F is provided with a slot 34, and the knob K has a shank which fits in said slot 34, so that the knob K can be slid laterally to and fro, without being turned. Likewise, the stop 29 is held against turning movement on the shank of the knob K. The inner end of the shank of the knob K is provided with a washer K², in order to assemble the parts.

When the stop 29 is used, the device is adapted for toasting relatively large pieces of bread. The actuation of the switch C is adjusted, so that this is moved to the circuit-opening position, when the lever 11 contacts with the stop 29. If it is desired to toast relatively small articles, such as muffins 12, the stop 29 is moved to the inoperative position, thus permitting the full upward movement of the lever 11 and of the support 13.

As shown in Fig. 4, a pivoted latch 37 can be provided. In the full line position shown in Fig. 4, the device is adapted to toast pieces of bread or relatively large articles, and in the dotted line position shown in Fig. 4, the device is adapted to toast muffins and smaller articles. This latch 37 is pivotally connected to the device at 39, and it has a bifurcated end 37ᵇ, which straddles the stationary bar 21, which serves as a guide for the sliding movement of the member 23. The latch 37 also has a projecting member 37ᶜ, which moves in a slot 37ᵃ of the end wall of the casing F'.

As shown in Fig. 6, the projection 37ᶜ is held in a slot 40 for toasting relatively large articles, and it is held in a slot 41 for toasting relatively small articles. The principle of operation is the same as before, that is, when the member 37ᶜ is in the slot 41, it permits the full upward movement of the support 13.

In the embodiment shown in Fig. 7, a single lever 32 is utilized, instead of the levers 11 and L'. The supply of current is regulated by a knob 33 and further illustration is not required, as Fig. 7 generally illustrates another well known type of toaster.

In the embodiment shown in Fig. 8, an improved support 43 is provided. The top of this support 43 is concave, and said support is connected to the member 23 by means of an angular connecting member 40ᵃ. The support 43 also has a lug 40ᵇ connected thereto, and this slides in a slot 42, which is provided in the inner casing F³.

As shown in Fig. 9, the member 43 may provide a support which supplements the main support 13, so that the device comprises two separate sections, one section for toasting pieces of bread 12ª, and another section for toasting muffins or other relatively small articles.

Heating elements 25ª are supported upon sheets of mica 25 in the usual manner.

As shown in Fig. 10, the muffin support 43 may be provided with lugs 43ª, which slide upon suitable verticle rods Bª, in order to maintain the muffins 12 in vertical position.

As shown in Fig. 11 the usual support 13 can be replaced by an improved support 113, which has a slot 112, in order to permit the pieces of bread 12ª to be held transversely in the usual position. However, if desired, muffins or other small articles 12 may be supported upon the upper wall 112ª. The upper wall 112ª is provided with openings 112ᵇ, through which stationary guide rods Bª pass.

Referring to the first embodiment, I have illustrated some of the usual parts, such as a guard 17, an extension cord 17ª, a carbon electrode 19, and a corresponding electrode 18. The timer is connected to a bracket 38, and the upper end of a guide 21 is also connected to the bracket 38. A time clock is identified by the reference letter 24, and it is held in position by means of bolts 39.

I have shown a preferred embodiment of my invention, but it is clear that numerous changes and omissions could be made without departing from its spirit.

For example, the top of the enclosing frame 30 of the device shown in Fig. 1, could have concave portions at the top so that a disk-like muffin or the like can be easily raised from the support even though the top of such muffin does not project above the top of the frame.

The device shown in Fig. 11 can form the support for the device shown in Fig. 1. The construction shown in Fig. 11 is particularly desirable because the support can hold a relatively thin piece of toast in the lower position, and it can hold a relatively thick piece of toast, a muffin, or the like, in the upper position.

I claim:

1. In an automatic toaster of the type which has a frame and a vertically movable support slidable in said frame, and a control device adapted to stop the upward movement of said support at a predetermined level, said support consisting of two platforms, the ends of the upper platform being spaced from each other so that a relatively thin article to be toasted can be directly supported upon said support intermediate said supporting means, and a relatively smaller or thicker article to be toasted can be directly supported on said upper supporting means.

2. In an automatic toaster of the type which has a frame and a vertically movable support slidable in said frame and a control device adapted to stop the upward movement of said support at a predetermined level, said support consisting of two platforms of different heights integral with each other, so that a relatively thin article to be toasted can be directly supported upon the lower support and a relatively smaller or thicker article to be toasted can be directly supported on the upper supporting means.

SAMUEL FREEMAN.